United States Patent [19]

Schmitt

[11] 4,156,743

[45] May 29, 1979

[54] METHOD FOR CONTINUOUSLY PRODUCING MILK CHOCOLATE MASSES

[76] Inventor: Armin Schmitt, 6056 Heusenstamm, Birkeneck 88, Fed. Rep. of Germany

[21] Appl. No.: 665,725

[22] Filed: Mar. 10, 1976

[51] Int. Cl.² ............................................. A23G 1/00
[52] U.S. Cl. .................................... 426/631; 426/660
[58] Field of Search .............. 426/584, 660, 631, 519, 426/613, 585

[56] References Cited

U.S. PATENT DOCUMENTS

| | | | |
|---|---|---|---|
| 3,357,836 | 12/1967 | Beetz | 426/519 |
| 3,904,777 | 9/1975 | Goerling et al. | 426/631 |
| 3,955,489 | 5/1976 | Goerling et al. | 426/631 |

*Primary Examiner*—Jeanette M. Hunter
*Attorney, Agent, or Firm*—Posnack, Roberts, Cohen & Spiecens

[57] ABSTRACT

A process for continuously producing milk chocolate masses, wherein the roasted cocoa kernel fragments are finely ground and, with the addition of cocoa butter, lecithin, sugar and powdered milk, are kneaded, rolled, homogenized and refined, in which the finely ground cocoa kernel fragments are subjected continuously and alternately to a batch mixing or kneading, and in this alternate batch treatment, cocoa butter and powdered milk are added, while, during the treatment of one batch, the other batch which has been mixed or kneaded is continuously removed and the mass already containing the powdered milk is subsequently subjected to a thin layer treatment for desiccation and evaporation while, subsequently, cocoa butter, lecithin and sugar are added to the mass and the mass is continuously subjected to alternate batch homogenization, from which the finished mass of one batch is continuously removed while the other batch undergoes homogenization.

5 Claims, 6 Drawing Figures

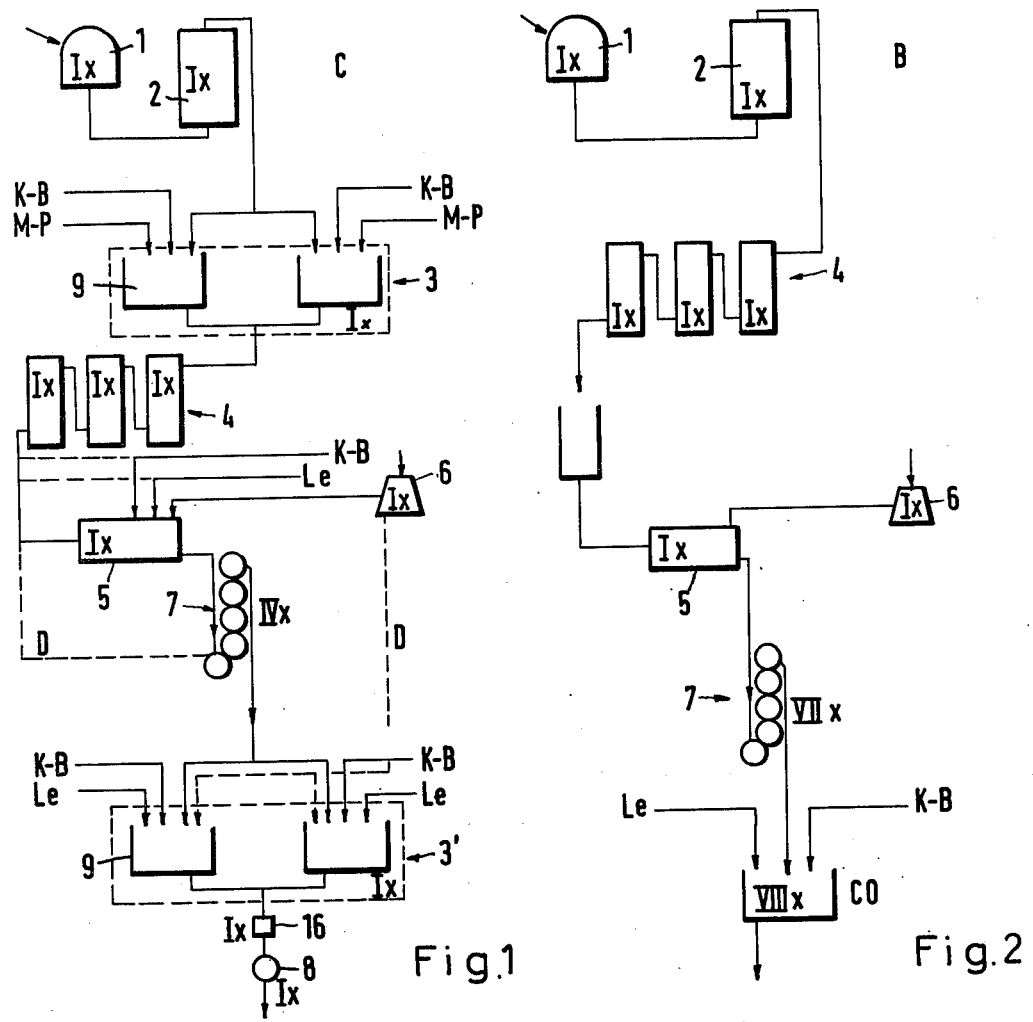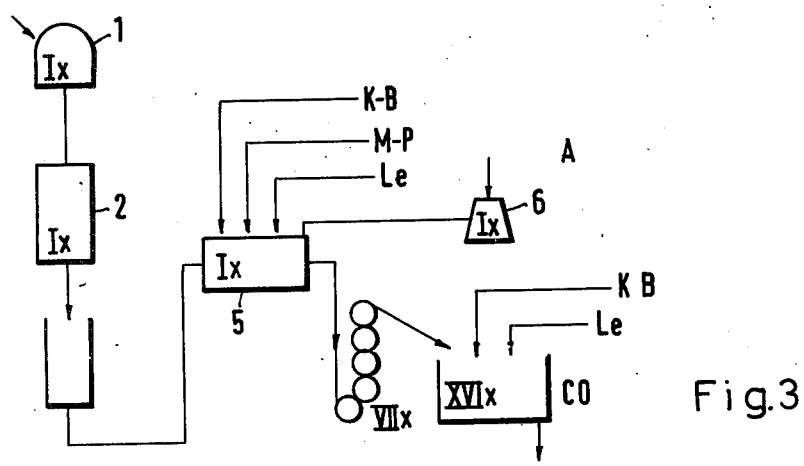

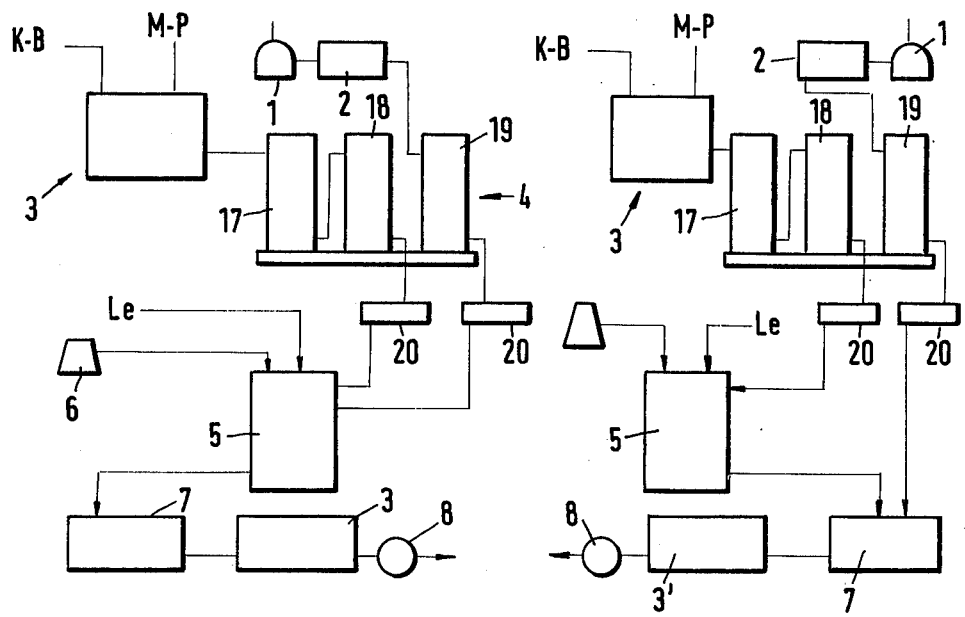
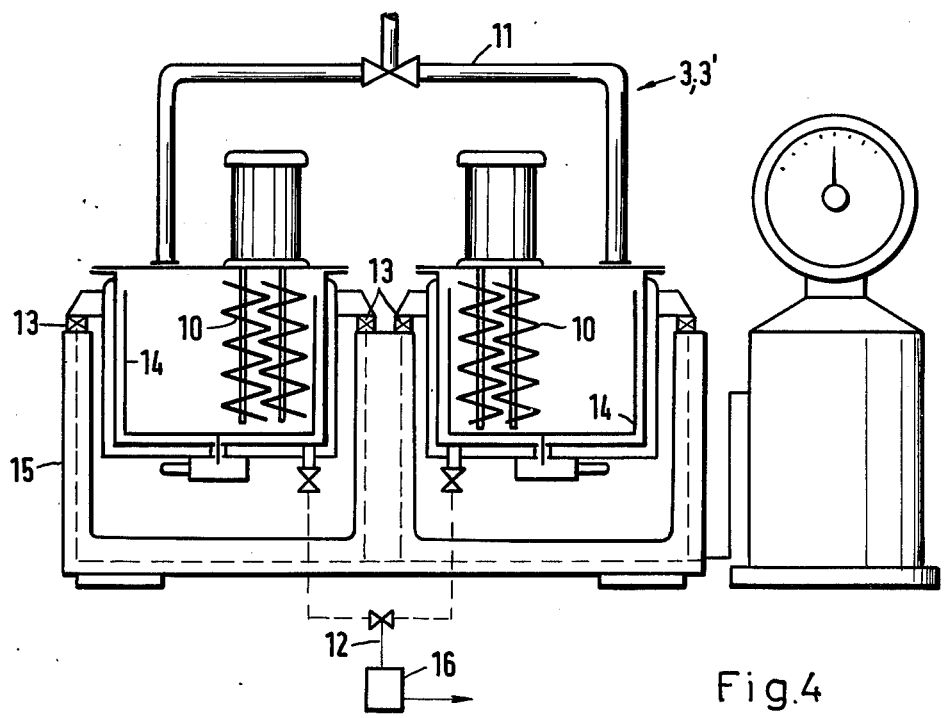

METHOD FOR CONTINUOUSLY PRODUCING MILK CHOCOLATE MASSES

The invention relates to a process for continuously producing milk chocolate masses, whereby the roasted cocoa kernal fragments are finely ground and, with the addition of sugar, lecithin, cocoa butter and powdered milk, are kneaded, rolled, homogenised and refined.

In order to obtain milk chocolate masses with a good flavour and a high degree of fineness, considerable machinery and time are needed, since processing steps, such as finely grinding the roasted cocoa kernal fragments, mixing in the cocoa butter, lecithin, sugar and powered milk, finely rolling and homogenising all the mass components and removing noxious flavours, are necessary, during which it is unavoidable that the mass will be treated in batches in the region of certain processing sections, and this is, of course, an obstruction to the desirable continuous treatment of the mass. Attempts to improve the course of the processing and, in particular, the long conche treatment periods, have already been made. Using a quasi semi-continuous process which uses the advantageous effect of continuous thin layer treatment (German Pat. No. 1 557 184) to expel noxious flavours and malodorous substances immediately after finely grinding the cocoa kernel fragments, the conche treatment time could be reduced, for example, from about 24 hours to only 8 to 12 hours, yielding an end product of the same quality, whereby the cocoa kernel fragments had to go through the following machines and apparatus:

Preliminary mill, fine mill, thin layer treatment apparatus, Konti kneader, rollers and conche. The conche treatment has to be carried out in batches, in order to eliminate the water necessarily introduced by means of the powdered milk added in advance of the Konti kneader, i.e., fairly late, until only the permissible proportion remains, since the water should only be present in a certain percentage in the end product, and thus also to expel any undesirable flavours which are also introduced by the powdered milk.

The total expenditure of energy and also the expenditure on machines are correspondingly high in traditional processes, and also in the semi-continuous process, particularly as a result of the necessary use of a conche. On the one hand, it had long been known that the conche time required could be reduced by increasing the energy concentration, but on the other hand one was forced to acknowledge that, for constructional reasons, it is no longer possible to increase the throughput density ($KW/m^3$) substantially. Nor does another possible method, namely first liquifying a crude chocolate mass consisting of cocoa, sugar, powdered milk and cocoa butter, in a suitable apparatus and subsequently subjecting it to a thin layer treatment, have the desired success. Indeed, extensive tests have shown that, although such a treatment is possible, the degree of success is too small and therefore is not an economical solution. Tests were able to show that the sensory properties of the chocolate mass are indeed noticeably changed from the better by the thin layer treatment, but that it was not possible to dehydrate and improve the viscosity of the mass to the desired final state under economical conditions and without forfeiting the quality of the mass in the short thin layer process. The great absorption characteristics of the sugar already contained in the mass are responsible for this.

The invention is based on the problem of providing a process which, while giving at least equal quality and the same throughput performance, compared with modern manufacturing processes conventionally used nowadays, uses less energy and machinery, can be carried out continuously, despite the unavoidable batch mixing, and wherein the homogenising process is already substantially free from the essential elimination of excess water and noxious flavours.

This problem is solved according to the invention with a process of the kind mentioned hereinbefore in that, to the finely ground cocoa kernel fragments which are continuously subjected to alternate batch mixing or kneading, in this alternate batch treatment cocoa butter and powdered milk are added, whilst, during the mixing or kneading of the one batch, the other batch which has finished being mixed or kneaded and already contains the powdered milk, is continuously fed into a thin layer refining apparatus and is subjected to a thin layer treatment therein, for the purpose of desiccation and evaporation, and subsequently cocoa butter, lecithin and sugar are added to the mass and are continuously subjected to alternate batch homogenisation, from which the finished mass of one batch is continuously removed during the time of homogenisation of the other batch.

Thus, the essential point here is that the powdered milk with its water content and noxious flavours is added already to the cocoa mass, which has not yet been evaporated and mixed with sugar, and is subjected to the thin layer refining treatment together with said cocoa mass, so that the mass removed therefrom already contains the powdered milk on the one hand, but, on the other hand, is already to a large extent free from excess water and noxious flavours, which means that the subsequent treatment steps are no longer complicated by the presence of these components which have to be removed.

A relatively long lasting conche treatment or refining time, which in itself is an obstruction to a fully continuous treatment, is therefore advantageously no longer required. The machinery needed for this treatment according to the invention, namely two batch mixers are intensive refiners operating alternately which will be described in more detail, only appears to be greater, as for one thing, batch mixers are not as costly and energy-consuming as conches and secondary, in the known above-mentioned semi-continuous process, it is not possible to make do with one conche, if the continuously operating part of the corresponding total plant is to operate non-stop. Advantageously, the mass can be passed through a static mixer (German Pat. No. 2 130 134) after the final refining step.

The apparatus for carrying out the process consists of preliminary mill, a fine mill, two batch mixers operating alternately, a thin layer treatment apparatus (German Pat. No. 1537184), a Konti kneader or batch mixer, a suger mill, set of rollers, a ball mill or the like and, if required, a static mixer. (German Pat. No. 2130134).

These apparatus which are known, apart from the batch mixer, and the machines are associated with one another, according to the invention, in such a way that an alternately continuously loadable and unloadable batch mixer is connected upstream of the thin layer refining apparatus and a correspondingly constructed mixer operating accordingly is connected downstream of said thin layer refining apparatus, with a Konti kneader and at least one fine grinder, such as a set of rollers, a ball mill or the like, connected therebetween.

The batch mixer is preferably constructed in such a way that two troughs provided with mixing and kneading elements are reversibly connected to filling and emptying conduits, while the troughs are mounted on load indicators. Instead of the Konti kneader, a corresponding batch mixer may also be used, and this has the advantage that only one type of mixer is used in the system. Depending on the flavour and quality requirements, the sugar may be added before or after the fine grinder (roller, ball mill or the like), while, if the sugar is added afterwards, it must, of course, be ground beforehand to the final degree of fineness, thus affecting the flavour in certain ways, since fully ground sugar results in a different nuance of flavour.

Depending on the origin and type of cocoa used as starting product, it may be very acidic, in which case there is a danger that this very acidic cocoa mass will react with the milk protein in an undesirable manner, leading to unsatisfactory results in the flavour of the end product. The process according to the invention also provides for this problem, a correspondingly advantageous charging possibility, with slight changes regarding the introduction of the individual masses, namely in that the cocoa butter and powdered milk are subjected to a batch mixing or kneading and, during the mixing and kneading of the subsequent batch, are conducted to a first and second stage of a thin layer refining apparatus, into which, at the same time, the finely ground cocoa kernel fragments are fed separately and continuously in the third stage, while lecithin and finely ground sugar are added to the mixed mass, which has been dehydrated and freed from noxious flavours in the thin layer refining apparatus, and kneaded with the mass and subsequently finely ground, and this mass, together with the cocoa mass, with the addition of cocoa butter, is subjected to a subsequent batch mixing or kneading in alternate batches, and, while one batch is being mixed, the other already mixed batch is continuously removed and passed on for further processing.

Depending on whether the process starts with cocoa kernel fragments already ground to their final degree of fineness or those which have not yet been ground to final fineness, in the latter case the process is performed in such a way that the cocoa mass, having passed through the third stage of the thin layer refining apparatus, is mixed at the same time as the sugar and lecithin, with the mass of cocoa butter and powdered milk being continuously discharged from the second stage of the thin layer refining apparatus, and the resulting mixture is continuously kneaded and subsequently finely ground, whereas in the former case the cocoa mass, ground to its final fineness, having passed through the third stage of the thin layer refining apparatus, is continuously fed into the kneaded and finely ground mass consisting of cocoa butter, powdered milk, sugar and lecithin and, together with this, is subjected to the subsequent batch mixing or kneading.

The process according to the invention, the apparatus for carrying it out and the advantages to be obtained with the process are hereinafter explained in more detail with reference to the drawings of embodiments by way of example.

The drawings show schematically:

FIG. 1 is a plan view of the flow diagram of the entire apparatus (apparatus C and apparatus D);

FIG. 2 in plan view the flow diagram of the apparatus for a known semi-continuous process (apparatus B);

FIG. 3 in plan view the flow diagram of the apparatus for another conventional process (apparatus A);

FIG. 4 in section the batch mixer;

FIG. 5 in plan view the flow diagram for a somewhat modified process sequence compared with FIG. 1, and FIG. 6 in plan view the flow diagram for a somewhat modified process sequence compared with FIG. 5.

In the figures, the following abreviations are used:
K-B = cocoa butter
M-P = powdered milk
Le = lecithin
Zu = sugar
Kg = Kilogram
h = hour
Co = conche
T = running time
A,B,C,D: designate the apparatus
Roman numerals : number of machines required with regard to the quantities being processed.

According to FIG. 1, the roasted and pre-fragmented cocoa kernels are ground in a preliminary mill 1 and a fine mill 2. From the fine mill 2 the mass passes to one of the troughs 9 of the batch mixer 3, while at the same time, during the treatment of the mass batch in the other trough 9, the mass is continuously discharged from the other trough 9 in each case. Cocoa butter and powdered milk are added to the finely ground cocoa by means of metering elements (not shown). The mass consisting of cocoa, cocoa butter and powdered milk, after being mixed, is then continuously conveyed out of a trough 9 into the thin layer treatment apparatus 4 consisting of three thin layer refining devices, in which excess water and noxious flavours contained in the mass both from the cocoa and from the milk powder are virtually eliminated, so that subsequent treatment does not have to deal with these. During the continuous emptying of one of the troughs, kneading and mixing is again taking place in the other trough.

Further cocoa butter and lecithin are added and mixed with the cocoa mass by means of a continuously operating kneader 5, to which the sugar ground in the sugar mill 6 can also be added. Instead of the kneader 5, a corresponding batch mixer according to FIG. 4 may also be used.

However, by by-passing the rollers 7, the sugar which has then necessarily been ground to its final fineness can first be introduced into the batch mixer 3', as shown by the dotted line (apparatus D). In this variant wherein the sugar is thus already ground to its final fineness, the kneader 5 can be dispensed with. The mass coming out of the kneader 5 passes via the rollers 7 into the batch mixer 3', also operating alternately, from which the finished mass is continuously discharged during the treatment time in the other trough 9.

The quantities processed in the individual apparatus and machines are given as examples in the flow diagram for comparison purposes. A static mixer 8 may also be connected downstream of the mixer 3'. In order to illustrate the advance obtained with this process, FIGS. 2 and 3 show a conventional process and the semi-continuous process (both known).

A comparison of the two has the following results:
The following recipe will serve as an example:

| | |
|---|---|
| 12% | cocoa mass |
| 18% | cocoa butter |
| 50% | sugar |
| 20% | full cream powdered milk |
| 100% | chocolate mass |

Four manufacturing processes were compared, namely (A) Conventional Process
(B) Semi-continuous Process
(C) New Process
(D) New Process, bringing the sugar to its final fineness in the mill 6.

An apparatus operating according to the new process (C) was designed for a throughput of 2 t/h=48 t/day. The apparatus (A), (B) and (D) give the same daily yields.

Compared with apparatus (A), machines were saved (−) or extra were needed (+):

| Apparatus (B) | |
|---|---|
| (−) 8 Conches with 3 t load | (+) 1 Thin layer refining apparatus 4 at 1000 kg/h |
| Apparatus (C) | |
| (−) 3 Sets of rollers at 500 kg/h | (+) 1 Thin layer refining apparatus 4 at 1000 kg/h |
| (−) 50% Kneader capacity (from t/h to 2 t/h) | (+) 2 Batch mixers 3,3' at 2 t/h |
| (−) 16 Conches with 3 t load | (+) 1 Static mixer 8 at 2 t/h |
| | (+) 1 Medium pressure mass pump 16 at 2 t/h |
| Apparatus (D) | |
| (−) 6 Sets of rollers at 500 kg/h | (+) 1 Thin layer refining apparatus 4 at 1000 kg/h |
| (−) 1 Kneader at t/h | (+) 2 Batch mixers 3,3' at 2 t/h |
| (−) 16 Conches | (+) 1 Static mixer 8 at 2 t/h |
| | (+) 1 Medium pressure mass pump 16 at 2 t/h |

With regard to the capital costs, the following ratio was obtained:

$$A:B:C:D = 3.4:2.7:1.6:1$$

i.e., for example, the apparatus A requires 3.4 times the capital expenditure compared with apparatus D, without taking into account the costs of the space, which decrease substantially, however, in the order (A), (B), (C), (D). The following picture is obtained for the energy expenditure:

$$A:B:C:D = 2.5:2:1.7:1$$

i.e., for example energy required in apparatus (A) is 2.5 times as great as that required in apparatus (D).

The two batch mixers 3 and 3' are constructed as follows, according to FIG. 4:

Preferably, the troughs 9 each contain a pair of mixing screws 10 meshing with each other, against which the mass is pressed by a stirring apparatus 14 during rotation. The two troughs 9 which are alternately filled by a reversible conduit 11 are mounted in a frame 15 on load cells 13, so that, when a trough has been completely filled with the relevant amount, the addition of all components is automatically stopped. While an intensive mixing treatment is taking place in one of the troughs 9, the other trough 9 is continuously being emptied, in order that a continuous overall throughflow is thus ensured. However, the basic pre-condition for this is the elimination, using the process, of excess moisture and noxious flavours from the mass, particularly in the final refinement stage, to permit the relatively short retention times.

EXAMPLE

To produce a chocolate mass in the apparatus C according to FIG. 1, the cocoa kernel fragments are ground in an impact-shearing mill of known construction and pass from this mill into a fine mill (ball mill), in a quantity of 240 kg/h. The fine mill is kept at a temperature of approx. 80° C. Of the liquid mass pumped out of the fine mill, 120 kg/h are fed into one of the troughs 9, while the mixed mass consisting of powdered milk, cocoa butter and cocoa is already being continuously removed from the other trough 9. (It is assumed that the starting process for putting the apparatus into operation is already complete). The liquid cocoa butter (100 kg/h) fed alternately into the troughs 9 is at a temperature of approx. 40° C. and the powdered milk approximately 20° C. Each trough is kept at approximately 50° C. by known tempering procedures. The retention time in one trough or the emptying time of the other trough is approximately a quarter of an hour in each case. The processing elements 10, 14 in the troughs have a rotation speed of about 1 m/sec. The mass being removed alternately and continuously from the troughs 9 of the batch mixer 3 now passes continuously through the 3 columns or stages of the thin layer refining apparatus 4, the inner draw and centrifuge elements of which are driven at a rotation speed of approx. 13 m/sec. In these three stages, the temperature is approximately 90° C., and the automatic temperature adjustment is carried out by means of air which has been heated to a greater or lesser extent, and has previously passed through a thermostatically regulated heating element. The columns are provided with water-filled double jackets which are used only for pre-heating, however, since the heat is then essentially supplied or produced by the friction of the mass and the air. The mass flowing out of this part of the apparatus at 840kg/ is cooled down to approximately 60° to 65° C. and passes into the kneader 5, which is cooled in such a way that the mass leaves it at approximately 30° C., after the ground sugar has previously been fed continuously into the kneader at approximately 50° C. from the mill 6, with the addition of 64 kg/h of liquid cocoa butter and lecithin. Then the mass leaving the kneader 5 at 1904 kg/h is continuously distributed over four chocolate roller sets 7 of known constructions, whereupon the mass cools to approximately 25° C. From there, the mass is continuously and alternately fed into the troughs 9 of the batch mixer 3', which are also being continuously supplied alternately with 48 kg/h of cocoa butter at 40° C. and with lacithin. As a result of the frictional heat and the heat supplied by the water-filled double jacket of the troughs, the temperature in the troughs is maintained at about 65° C. and then, under pressure from the pump 16, the mass, having passed continuously through the static mixer 8 of known construction, moves on for further processing, for example to be made into bars.

The quantity of lecithin added is approximately 0.4%, based on the total weight of the processed mass.

FIG. 5 shows the flow diagram of a rather different process sequence, i.e., for strongly acidic cocoa kernel fragments. The same reference numerals are used for the individual mechanisms and apparatus. In contrast to apparatus (C) in FIG. 1, cocoa butter and powdered milk, on the one hand, and cocoa kernel fargments, on the other hand, are treated separately until they reach the kneader 5, i.e., the cocoa butter and powdered milk pass through only the first and second stages 17, 18 of the thin layer refining apparatus and the ground cocoa kernel fragments separately pass through the third stage 19, so that the acid constituents which are to be eliminated in stage 19 cannot have a detrimental effect on the milk protein. Via heat exchangers 20, the powdered milk/cocoa butter mixture and the cocoa mass pass into the kneader 5, etc.

The flow diagram according to FIG. 6 differs only in that, in this case, the cocoa mass already ground to final fineness in the mills 1, 2 does not pass into the kneader 5, but straight into the batch mixer 3', while only the cocoa butter, powdered milk, sugar and lecithin are conveyed via the kneader 5 and the rollers 7. The capacity of the kneaders and rollers can thus be reduced accordingly.

What is claimed is:

1. A process for continuously producing milk chocolate mass wherein roasted finely ground cocoa kernel fragments, cocoabutter, lecithin sugar and powdered milk are kneaded, rolled, homogenized and refined, said process comprising the steps of:

continuously subjecting cocoa kernel fragments to alternate batch mixing;

adding cocoabutter and powdered milk to the cocoa mass during the alternate batch mixing;

continuously feeding one already mixed batch into a thin layer refining apparatus during the mixing of a second batch;

subsequently adding cocoabutter, lecithin and sugar to the mass while continuously subjecting the mass to alternate batch homogenization; and continuously removing the finished mass of one batch during the homogenization of the other batch, whereby the powdered milk with its water content and noxious flavors are added to the cocoa mass which has not been evaporated and mixed with sugar and is subjected to thin layer refinement treatment together with the cocoa mass so that the mass removed therefrom contains the powdered milk but is substantially free from excess water and noxious flavors thereby obviating the need for subsequent treatment steps.

2. A process according to claim 1, in which the mass removed from the batch homogenisation is subsequently passed through a static mixer.

3. A process according to claim 1, in which the sugar is ground to its final fineness and is added in the final homogenisation stage.

4. A process according to claim 1, further including the step of passing the cocoa mass through a third stage of the thin layer refining apparatus at the same time as the sugar and lecithin, the cocoa mass being mixed with the mass of cocoa butter and powdered milk continuously discharged from the second stage of the thin layer refining apparatus and being continuously kneaded and subsequently finely ground.

5. A process according to claim 4, characterised in that the cocoa mass ground to final fineness, having passed through the third stage of the thin layer refining apparatus, is continuously fed into the kneaded and finely ground mass consisting of cocoa butter, powdered milk, sugar and lecithin, and together with this is subjected to subsequent batch mixing or kneading.

* * * * *